United States Patent
Barrick et al.

(10) Patent No.: US 11,470,763 B2
(45) Date of Patent: Oct. 18, 2022

(54) SYSTEM AND METHOD FOR DETERMINING SUBSURFACE SOIL LAYER CHARACTERISTICS BASED ON RADAR AND LOAD DATA

(71) Applicant: CNH Industrial Canada, Ltd., Saskatoon (CA)

(72) Inventors: Christopher Barrick, Morton, IL (US); James W. Henry, Saskatoon (CA)

(73) Assignee: CNH INDUSTRIAL CANADA, LTD., Saskatoon (CA)

( * ) Notice: Subject to any disclaimer, the term of this patent is extended or adjusted under 35 U.S.C. 154(b) by 525 days.

(21) Appl. No.: 16/677,054

(22) Filed: Nov. 7, 2019

(65) Prior Publication Data
US 2021/0136995 A1     May 13, 2021

(51) Int. Cl.
*A01B 79/00* (2006.01)
*G01S 13/88* (2006.01)
(Continued)

(52) U.S. Cl.
CPC .............. *A01B 79/005* (2013.01); *G01S 7/40* (2013.01); *G01S 13/885* (2013.01); *G01S 13/89* (2013.01)

(58) Field of Classification Search
CPC ..... A01B 79/005; A01B 19/02; A01B 61/044; G01S 7/40–4004; G01S 13/885; G01S 13/89
See application file for complete search history.

(56) References Cited

U.S. PATENT DOCUMENTS 6,041,582 A     3/2000  Tiede et al.
6,834,550 B2   12/2004  Shrinivasa et al.
(Continued)

FOREIGN PATENT DOCUMENTS

EP     3300558 A1    4/2018
EP     3095310 B1    5/2018
WO   WO2017158006   9/2017

OTHER PUBLICATIONS

Hedley, Carolyn B., "The Development of Proximal Sensing Methods for Soil Mapping and Monitoring, and Their Application to Precision Irrigation," Massey University, 2009, 276 pages.
(Continued)

*Primary Examiner* — Matthew M Barker
(74) *Attorney, Agent, or Firm* — Rebecca Henkel; Rickard DeMille (57) ABSTRACT

In one aspect, a system for determining subsurface soil layer characteristics as an agricultural implement is towed across a field by a work vehicle may include a RADAR sensor configured to capture data indicative of a subsurface soil layer characteristic of the field. Furthermore, the system may include a load sensor configured to capture data indicative of a load applied to the agricultural implement by soil within the field, with the load being indicative of the subsurface soil layer characteristic. Additionally, a controller of the system may be configured to determine a first value of the subsurface soil layer characteristic based on the data received from the RADAR and a second value of the subsurface soil layer characteristic based on the data received from the load sensor. Moreover, the controller may be configured to determine a differential between the first value and the second value.

19 Claims, 4 Drawing Sheets

(51) Int. Cl.
*G01S 7/40* (2006.01)
*G01S 13/89* (2006.01)

(56) References Cited

U.S. PATENT DOCUMENTS

| | | | |
|---|---|---|---|
| 7,254,485 B2 | 8/2007 | Rooney et al. | |
| 8,453,754 B2 | 6/2013 | Beaujot | |
| 8,738,244 B2 | 5/2014 | Lenz et al. | |
| 9,285,501 B2 | 3/2016 | Christy et al. | |
| 9,433,142 B2 | 9/2016 | Bergen et al. | |
| 9,750,174 B2 | 9/2017 | Sauder et al. | |
| 9,801,329 B2 | 10/2017 | Zielke | |
| 10,006,994 B2 | 6/2018 | Chan et al. | |
| 10,028,425 B2 * | 7/2018 | Canyon | A01B 79/005 |
| 10,123,475 B2 | 11/2018 | Posselius et al. | |
| 10,219,430 B2 | 3/2019 | Blomme et al. | |
| 11,071,245 B2 * | 7/2021 | Puhalla | G01S 13/08 |
| 2016/0237630 A1 | 8/2016 | Aho | |
| 2018/0114305 A1 | 4/2018 | Strnad et al. | |
| 2018/0206393 A1 | 7/2018 | Stoller et al. | |
| 2018/0292339 A1 | 10/2018 | Gunzenhauser | |
| 2019/0075710 A1 * | 3/2019 | Strnad | G01B 15/00 |
| 2020/0128723 A1 * | 4/2020 | Eichhorn | A01B 79/005 |
| 2020/0359559 A1 * | 11/2020 | Koch | A01C 5/068 |
| 2021/0026007 A1 * | 1/2021 | Ferrari | A01B 79/005 |

OTHER PUBLICATIONS

Raper, R.L., et al., "Sensing Hard Pan Depth with Ground-Penetrating Radar," Transactions of the ASAE, vol. 33, Issue 1, published Dec. 1, 1990, pp. 41-46.

"Steyr Soilxplorer Soil Sensor: An Innovative Way to 'Deepen' Farmers Knowledge of Their Soil and Increase Their Tillage Efficiency" Steyr Traktoren, https://www.steyr-traktoren.com/en-distributor/agriculture/News-Site/Pages/2018-11-21-STEYR-SOILXPLORER.aspx, 3 pages, 2018.

* cited by examiner

SYSTEM AND METHOD FOR DETERMINING SUBSURFACE SOIL LAYER CHARACTERISTICS BASED ON RADAR AND LOAD DATA

FIELD OF THE INVENTION

The present disclosure generally relates to systems and methods for determining subsurface soil layer characteristics of a field and, more particularly, to systems and methods for determining subsurface soil layer characteristics of a field based on RADAR data and load data.

BACKGROUND OF THE INVENTION

It is well known that, to attain the best agricultural performance from a piece of land, a farmer must cultivate the soil, typically through a tillage operation. Common tillage operations include plowing, harrowing, and subsoiling. Modern farmers perform these tillage operations by pulling a tillage implement behind an agricultural work vehicle, such as a tractor. Depending on the crop selection and the soil conditions, a farmer may need to perform several tillage operations at different times over a crop cycle to properly cultivate the land to suit the crop choice.

When performing a tillage operation, it is desirable to create a level and uniform layer of tilled soil across the field to form a proper seedbed for subsequent planting operations. Furthermore, it is generally desirable to break up any layers of subsurface soil that have been compacted (e.g., due to vehicle traffic, ponding, and/or the like). In this regard, tillage implements often include one or more sensors mounted thereon to monitor various subsurface soil layer characteristics during the performance of such tillage operations. For example, some tillage implements include one or more radio detection and ranging (RADAR) sensors that capture radar data of the subsurface soil layer(s) within the field. However, varying soil conditions across the field and/or other factors may cause the captured radar data to provide an inaccurate indication(s) of the subsurface soil layer characteristic(s).

Accordingly, an improved system and method for determining subsurface soil layer characteristics would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for determining subsurface soil layer characteristics as an agricultural implement is towed across a field by a work vehicle. The system may include a RADAR sensor provided in operative association with one of the work vehicle or the agricultural implement, with the RADAR sensor configured to capture data indicative of a subsurface soil layer characteristic of the field. Furthermore, the system may include a load sensor provided in operative association with one of the work vehicle or the agricultural implement. As such, the load sensor may be configured to capture data indicative of a load applied to the agricultural implement by soil within the field, with the load being indicative of the subsurface soil layer characteristic. Additionally, the system may include a controller communicatively coupled to the load sensor and the RADAR sensor. In this regard, the controller may be configured to determine a first value of the subsurface soil layer characteristic based on the data received from the RADAR sensor. Moreover, the controller may be configured to determine a second value of the subsurface soil layer characteristic based on the data received from the load sensor. In addition, the controller may be configured to determine a differential between the first value and the second value.

In another aspect, the present subject matter is directed to a method for determining subsurface soil layer characteristics as an agricultural implement is towed across a field by a work vehicle. The method may include determining, with one or more computing devices, a first value of a subsurface soil layer characteristic based on received RADAR data. Furthermore, the method may include determining, with the one or more computing devices, a second value of the subsurface soil layer characteristic based on received data indicative of a load being applied to the agricultural implement by soil within the field. Additionally, the method may include determining, with the one or more computing devices, a differential between the first value and the second value. Moreover, the method may include calibrating, with the one or more computing devices, the determined first value of the subsurface soil layer characteristic based on the determined differential.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for determining subsurface soil layer characteristics as an agricultural implement is being towed across a field by a work vehicle. Specifically, in several embodiments, one or more radio detection and ranging (RADAR) sensors may be provided in operative association with the vehicle and/or the implement. In this respect, as the vehicle/implement travels across the field to perform an agricultural operation (e.g., a tillage operation) thereon, the RADAR sensor(s) may be configured to capture data indicative of one or more subsurface soil layer characteristics (e.g., the presence and/or location of a compaction layer) of the field. Furthermore, one or load sensors may be provided in operative association with the vehicle and/or the implement. In this regard, as the vehicle/implement travels across the field to perform the agricultural operation, the load sensor(s) may be configured to capture data indicative of the load applied to the implement by soil within the field, with such load being indicative of the subsurface soil layer characteristic(s). Thereafter, the controller may be configured to determine a first value(s) of the subsurface soil layer characteristic(s) based on the data received from the RADAR sensor(s) and a second value(s) of the subsurface soil layer characteristic(s) based on the data received from the load sensor(s).

In accordance with aspects of the present subject matter, the controller may be configured to truth and/or calibrate the determined first value(s) of the subsurface soil layer characteristic(s). In general, the second subsurface soil layer characteristic value(s) (i.e., the value(s) determined based on the data received from the load sensor(s)) may generally be more accurate the first subsurface soil layer characteristic value(s) (i.e., the value(s) determined based on the data received from the RADAR sensor(s)). As such, the controller may be configured to determine the differential(s) between the corresponding first and second subsurface soil layer characteristic values. Such differential(s) may, in turn, provide an indication of the accuracy of or otherwise truth the corresponding first value(s) of the subsurface soil layer characteristic(s). Additionally, in several embodiments, the controller may be configured to calculate or determine a correction factor(s) based on the determined differential(s). Thereafter, the controller may be configured to adjust the determined first value(s) of the subsurface soil layer characteristic(s) based on the correction factor(s) to calibrate the first value(s).

Thus, the disclosed systems and methods enable a more accurate determination of the subsurface soil layer characteristics (e.g., the presence and/or location of a compaction layer) of a field, which improves control of the work vehicle and/or implement to obtain desired field surface conditions within a field and, as a result, leads to superior agricultural outcomes.

Figure 1:
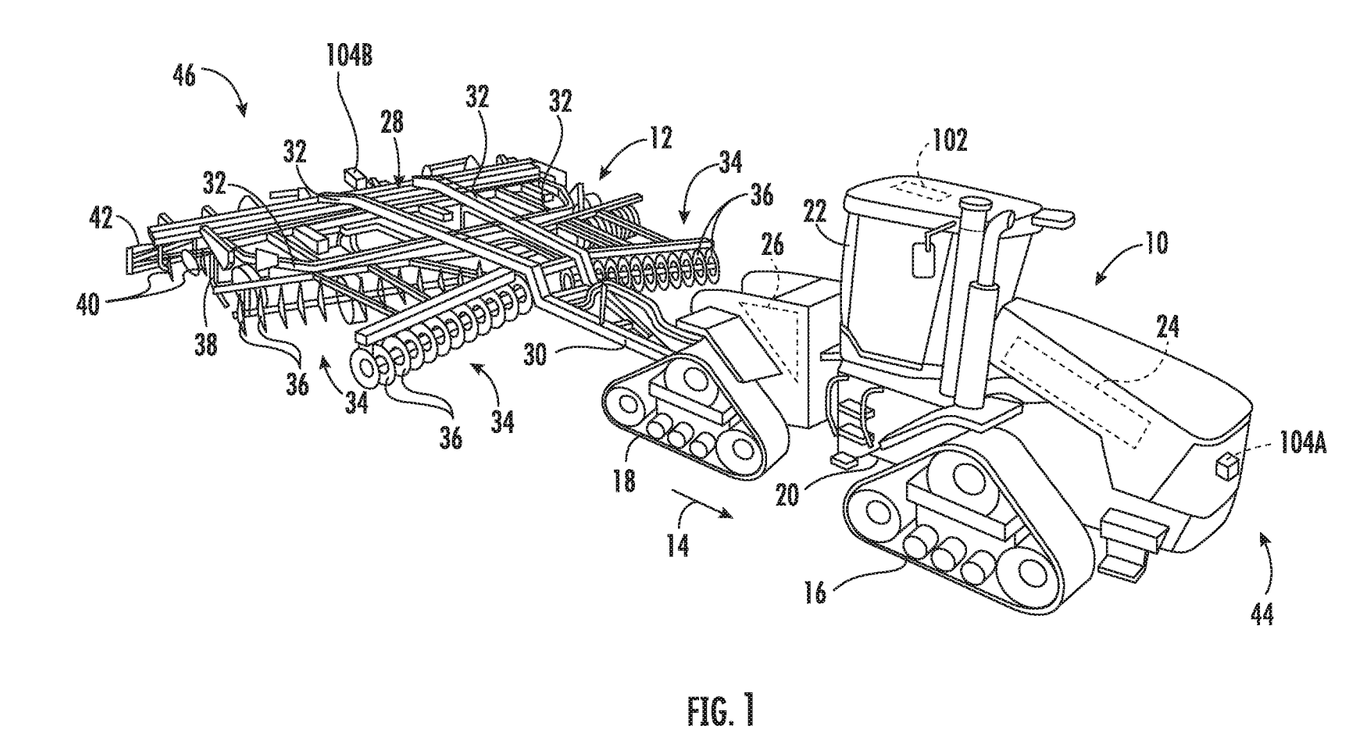
FIG. 1 illustrates a perspective view of one embodiment of a work vehicle towing an implement in accordance with aspects of the present subject matter.

Referring now to the drawings, FIG. 1 illustrates a perspective view of one embodiment of a work vehicle 10 and an associated agricultural implement 12 in accordance with aspects of the present subject matter. In general, the work vehicle 10 may be configured to tow the implement 12 across a field in a direction of travel (e.g., as indicated by arrow 14 in FIG. 1). As such, in one embodiment, the work vehicle 10 may be configured as an agricultural tractor and the implement 12 may be configured as a tillage implement. However, in other embodiments, the work vehicle 10 may be configured as any other suitable work vehicle. Similarly, the implement 12 may be configured as any other suitable agricultural implement.

As shown, the work vehicle 10 may include a pair of front track assemblies 16, a pair or rear track assemblies 18, and a frame or chassis 20 coupled to and supported by the track assemblies 16, 18. An operator's cab 22 may be supported by a portion of the chassis 20 and may house various input devices (e.g., a user interface) for permitting an operator to control the operation of one or more components of the work vehicle 10 and/or one or more components of the implement 12. Additionally, the work vehicle 10 may include an engine 24 and a transmission 26 mounted on the chassis 20. The transmission 26 may be operably coupled to the engine 24 and may provide variably adjusted gear ratios for transferring engine power to the track assemblies 16, 18 via a drive axle assembly (not shown) (or via axles if multiple drive axles are employed).

Additionally, as shown in FIG. 1, the implement 12 may generally include a frame 28 configured to be towed by the vehicle 10 via a pull hitch or tow bar 30 in the direction of travel 14. In general, the frame 28 may include a plurality of structural frame members 32, such as beams, bars, and/or the like, configured to support or couple to a plurality of components. As such, the frame 28 may be configured to support a plurality of ground-engaging tools, such as a plurality of shanks, disk blades, leveling blades, basket assemblies, tines, spikes, and/or the like. In one embodiment, the various ground-engaging tools may be configured to perform a tillage operation or any other suitable ground-engaging operation on the field across which the implement 12 is being towed. For example, in the illustrated embodiment, the frame 28 is configured to support various gangs 34 of disk blades 36, a plurality of ground-engaging shanks 38, a plurality of leveling blades 40, and a plurality of crumbler wheels or basket assemblies 42. However, in alternative embodiments, the frame 28 may be configured to support any other suitable ground-engaging tool(s) or combinations of ground-engaging tools.

Moreover, a location sensor 102 may be provided in operative association with the vehicle 10 and/or the implement 12. For instance, as shown in FIG. 1, the location sensor 102 is installed on or within the vehicle 10. However, in other embodiments, the location sensor 102 may be installed on or within the implement 12. In general, the location sensor 102 may be configured to determine the current location of the vehicle 10 and/or the implement 12 using a satellite navigation positioning system (e.g. a GPS system, a Galileo positioning system, the Global Navigation satellite system (GLONASS), the BeiDou Satellite Navigation and Positioning system, and/or the like). In such an embodiment, the location determined by the location sensor 102 may be transmitted to a controller(s) of the vehicle 10 and/or the implement 12 (e.g., in the form coordinates) and stored within the controller's memory for subsequent processing and/or analysis. For instance, based on the known dimensional configuration and/or relative positioning between the vehicle 10 and the implement 12, the determined location from the location sensor 102 may be used to geo-locate the implement 12 within the field.

In accordance with aspects of the present subject matter, the vehicle/implement 10/12 may include one or more radio detection and ranging (RADAR) sensors coupled thereto and/or mounted thereon. As will be described below, each RADAR sensor may be configured to capture RADAR data associated with a portion of the field across which the vehicle/implement 10/12 is traveling. The captured RADAR data may, in turn, be indicative of one or more subsurface soil layer characteristics of the field, such as the presence and/or location of a subsurface soil compaction layer. As such, in several embodiments, the RADAR sensor(s) may be provided in operative association with the vehicle/implement 10/12 such that the sensor(s) has an associated field(s) of view or sensor detection range(s) directed towards a portion(s) of the field adjacent to the vehicle/implement 10/12. For example, as shown in FIG. 1, in one embodiment, one RADAR sensor 104A may be mounted on a forward end 44 of the work vehicle 10 to capture RADAR data associated with a section of the field disposed in front of the vehicle 10 relative to the direction of travel 14. Similarly, as shown in FIG. 1, a second RADAR sensor 104B may be mounted on an aft end 46 of the implement 12 to capture RADAR data associated with a section of the field disposed behind the implement 12 relative to the direction of travel 14. However, in alternative embodiments, the RADAR sensors 104A, 104B may be installed at any other suitable location(s) on the vehicle/implement 10/12. Additionally, in some embodiments, the vehicle/implement 10/12 may include only one RADAR sensor or three or more RADAR sensors.

Figure 2:
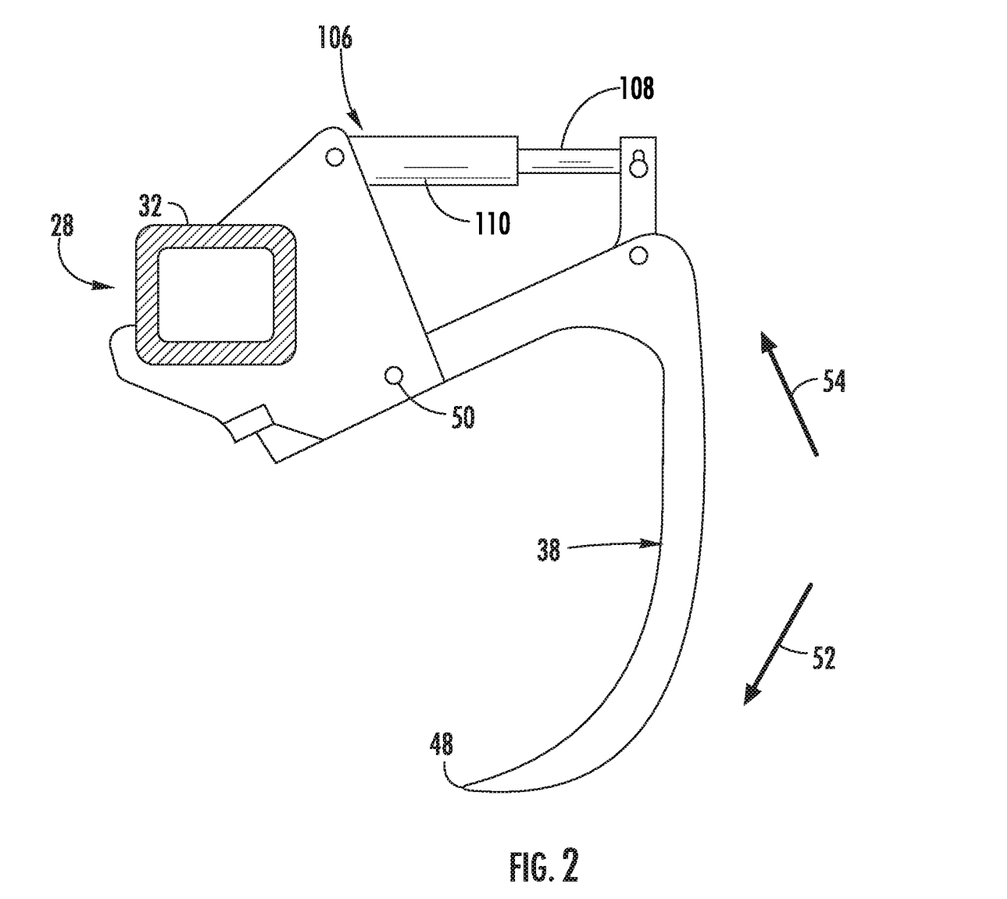
FIG. 2 illustrates a side view of one embodiment of a shank of an agricultural implement in accordance with aspects of the present subject matter.

Referring now to FIG. 2, a side view of one embodiment of one of the shanks 38 of the implement 12 described above with reference to FIG. 1 is illustrated in accordance with aspects of the present subject matter. As indicated above, the shanks 38 may be configured to till or otherwise cultivate the soil. In this regard, one end of each shank 38 may include a tip 48 configured to penetrate or otherwise engage the ground as the implement 12 is pulled across the field. The opposed end of each shank 38 may be pivotally coupled to the implement frame 28, such as at pivot point 50. As such, each shank 38 may be configured to pivot relative to the frame 28 in a manner that adjusts its penetration depth. In one embodiment, the various shanks 38 of the implement 12 may be configured as rippers. However, in alternative embodiments, the shanks 38 may be configured as chisels, sweeps, tines, or any other suitable type of shanks. Furthermore, the other shanks coupled to the frame 28 may have the same or a similar configuration to as the shank 38 shown in FIG. 2.

In several embodiments, the implement 12 may include one or more actuators, with each actuator 106 coupled between the frame 28 and each shank 38. In general, each actuator 106 may be configured to move or otherwise adjust the orientation or position of the corresponding shank 38 relative to the implement frame 28 in a manner that adjusts the penetration depth of the shank 38. More specifically, as shown in the illustrated embodiment, a first end of each actuator 106 (e.g., a rod 108 of each actuator 106) may be coupled to the corresponding shank 38, while a second end of each actuator 106 (e.g., the cylinder 110 of each actuator 106) may be coupled to the frame 28. As such, the rod 108 of each actuator 106 may be configured to extend relative to the corresponding cylinder 110 to pivot the corresponding shank 38 relative to the frame 28 in a first pivot direction (e.g., as indicated by arrow 52 in FIG. 2), thereby increasing the penetration depth of the shank 38. Similarly, the rod 108 of each actuator 106 may be configured to retract relative to the corresponding cylinder 110 to pivot the corresponding shank 38 relative to the frame 28 in a second pivot direction (e.g., as indicated by arrow 54 in FIG. 2), thereby decreasing the penetration depth of the shank 38. In the illustrated embodiment, each actuator 106 corresponds to a fluid-driven actuator, such as a hydraulic or pneumatic cylinder. However, in alternative embodiments, each actuator 106 may correspond to any other suitable type of actuator, such as an electric linear actuator.

It should be further appreciated that the configuration of the work vehicle 10 and the agricultural implement 12 described above and shown in FIG. 1 is provided only to place the present subject matter in an exemplary field of use. Thus, it should be appreciated that the present subject matter may be readily adaptable to any manner of agricultural machine configuration.

Figure 3:
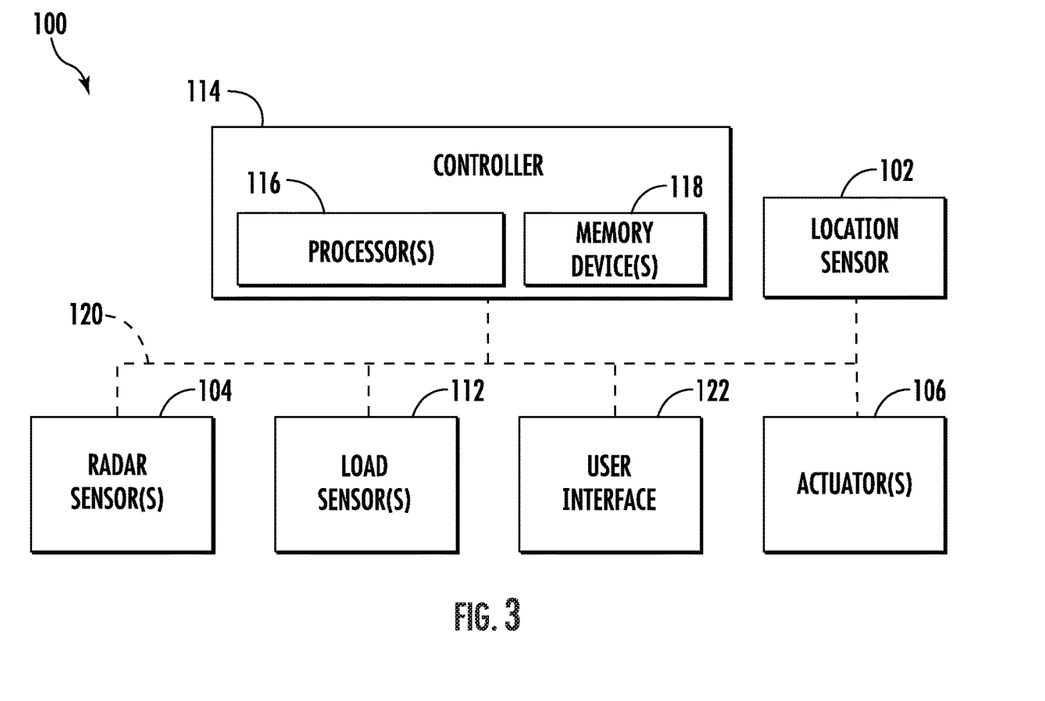
FIG. 3 illustrates a schematic view of one embodiment of a system for determining subsurface soil layer characteristics in accordance with aspects of the present subject matter.

Referring now to FIG. 3, a schematic view of one embodiment of a system 100 for determining subsurface soil layer characteristics is illustrated in accordance with aspects of the present subject matter. In general, the system 100 will be described herein with reference to the work vehicle 10 and the agricultural implement 12 described above with reference to FIGS. 1 and 2. However, it should be appreciated by those of ordinary skill in the art that the disclosed system 100 may generally be utilized with work vehicles having any other suitable vehicle configuration and/or agricultural implements having any other suitable implement configuration.

As shown in FIG. 2, the system 100 may include one or more RADAR sensor(s) 104 coupled to or otherwise mounted on the vehicle/implement 10/12. Specifically, in several embodiments, as the vehicle/implement 10/12 travel across the field to perform an agricultural operation (e.g., a tillage operation) thereon, the RADAR sensor(s) 104 may be configured to emit one or more radio wave and/or microwave output signals directed toward a portion of the field surface within the corresponding field of view or sensor detection zone. A portion of the output signal(s) may, in turn, be reflected by one or more subsurface soil layers (e.g., the compaction layer) as echo signal(s). Moreover, the RADAR sensor(s) 104 may be configured to receive the reflected echo signal(s). In this regard, the time of flight, amplitude, frequency, and/or phase of the received echo signal(s) may be indicative of the subsurface soil layer characteristic(s) of the field. As such, the RADAR sensor(s) 104 may correspond to any suitable type RADAR-based sensing device(s), such as a ground-penetrating RADAR (GPR) sensor(s), a multiple-input-multiple-output (MIMO) radar sensor(s), a polarimetric radar sensor(s), and/or the like.

Additionally, the system 100 may include one or more load sensor(s) 112 coupled to or otherwise mounted on the vehicle/implement 10/12. In general, as the vehicle/implement 10/12 travel across the field to perform an agricultural operation (e.g., a tillage operation) thereon, the load sensor(s) 112 may be configured to capture data indicative of the load applied to the implement 12 by soil within the field. Such load may, in turn, be indicative of the subsurface soil layer characteristic(s) of the field. In several embodiments, the load sensor(s) 112 may correspond to a draft load sensor configured to capture data indicative of the draft load applied to the vehicle 10 by the implement 12. For example, in one embodiment, the draft load sensor may be configured as a load pin coupled between the hitch 30 of the implement 12 and the vehicle 10. As such, the load pin may be configured to detect the draft force applied to the vehicle 10 by the hitch 30. Such draft load may, in turn, be indicative of the load applied to the implement 12 by soil.

In other embodiments, the load sensor(s) 112 may correspond to one or more pressure sensors, with each pressure sensor being provided in operative association with a respective one of the actuators 106. In general, the pressure sensor(s) may be configured to detect or measure the pressure of the fluid supplied within the corresponding actuator(s) 106. For example, in one embodiment, each pressure sensor may be provided in fluid communication with a fluid chamber defined within the corresponding actuator 106 (e.g., a piston-side chamber or a rod-side chamber of the corresponding actuator 106). Alternatively, the pressure sensor(s) may be installed at any other suitable location(s) that allows the pressure sensor(s) to measure the pressure of the fluid supplied within the actuator(s) 106, such as by installing the pressure sensor(s) in fluid communication with a hose(s) or a conduit(s) configured to supply fluid to the actuator(s) 106. The pressure of the fluid supplied within the actuator(s) 106 may, in turn, be indicative of the force exerted on the shanks 38 by the soil through which the shanks 38 are being pulled. However, in alternative embodiments, the load sensor(s) 112 may correspond to any suitable type of sensor(s) that detect the forces exerted on the vehicle/implement 10/12 by the soil within the field.

In accordance with aspects of the present subject matter, the system 100 may include a controller 114 positioned on and/or within or otherwise associated with the vehicle 10 and/or the implement 12. In general, the controller 114 may comprise any suitable processor-based device known in the art, such as a computing device or any suitable combination of computing devices. Thus, in several embodiments, the controller 114 may include one or more processor(s) 116 and associated memory device(s) 118 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 118 of the controller 114 may generally comprise memory element(s) including, but not limited to, a computer readable medium (e.g., random access memory (RAM)), a computer readable non-volatile medium (e.g., a flash memory), a floppy disc, a compact disc-read only memory (CD-ROM), a magneto-optical disc (MOD), a digital versatile disc (DVD), and/or other suitable memory elements. Such memory device(s) 118 may generally be configured to store suitable computer-readable instructions that, when implemented by the processor(s) 116, configure the controller 114 to perform various computer-implemented functions.

In addition, the controller 114 may also include various other suitable components, such as a communications circuit or module, a network interface, one or more input/output channels, a data/control bus and/or the like, to allow controller 114 to be communicatively coupled to any of the various other system components described herein (e.g., the location sensor 102, the RADAR sensor(s) 104, the actuator(s) 106, and/or the load sensor(s) 112). For instance, as shown in FIG. 2, a communicative link or interface 120 (e.g., a data bus) may be provided between the controller 114 and the components 102, 104, 106, 112 to allow the controller 114 to communicate with the components 102, 104, 106, 112 via any suitable communications protocol (e.g., CANBUS).

The controller 114 may correspond to an existing controller(s) of the vehicle 10 and/or the implement 12, itself, or the controller 114 may correspond to a separate processing device. For instance, in one embodiment, the controller 114 may form all or part of a separate plug-in module that may be installed in association with the vehicle 10 and/or the implement 12 to allow for the disclosed systems to be implemented without requiring additional software to be uploaded onto existing control devices of the vehicle 10 and/or the implement 12. It should also be appreciated that the functions of the controller 114 may be performed by a single processor-based device or may be distributed across any number of processor-based devices, in which instance such devices may be considered to form part of the controller 114. For instance, the functions of the controller 114 may be distributed across multiple application-specific controllers, such as an engine controller, a transmission controller, an implement controller, and/or the like.

Furthermore, in one embodiment, the system 100 may also include a user interface 122. More specifically, the user interface 122 may be configured to provide feedback (e.g., a feedback associated with the subsurface soil layer characteristic(s) of the field) to the operator of the vehicle/implement 10/12. As such, the user interface 122 may include one or more feedback devices (not shown), such as display screens, speakers, warning lights, and/or the like, which are configured to communicate such feedback. In addition, some embodiments of the user interface 122 may include one or more input devices (not shown), such as touchscreens, keypads, touchpads, knobs, buttons, sliders, switches, mice, microphones, and/or the like, which are configured to receive user inputs from the operator. In one embodiment, the user interface 122 may be mounted or otherwise positioned within the cab 22 of the vehicle 10. However, in alternative embodiments, the user interface 122 may mounted at any other suitable location.

In several embodiments, the controller 114 may be configured to determine a first value(s) of one or more subsurface soil layer characteristics of the field across which the vehicle/implement 10/12 is traveling. As described above, the vehicle/implement 10/12 may include one or more RADAR sensors 104, with each RADAR sensor 104 configured to capture RADAR data of a portion of the field within its field of view. In this regard, as the vehicle/implement 10/12 travels across the field to perform an agricultural operation (e.g., a tillage operation) thereon, the controller 114 may be configured to receive RADAR data from the RADAR sensor(s) 104 (e.g., via the communicative link 120). Thereafter, the controller 114 may be configured to process/analyze the received RADAR data to determine or estimate the first value(s) of the subsurface soil layer characteristic(s) of the field at the current location of the vehicle/implement 10/12. For instance, the controller 114 may include a look-up table(s), suitable mathematical formula, and/or algorithms stored within its memory device(s) 110 that correlates the received RADAR data to the subsurface soil layer characteristic(s) of the field.

Additionally, in several embodiments, the controller 114 may be configured to determine a second value(s) of the subsurface soil layer characteristic(s) of the field across which the vehicle/implement 10/12 is traveling. More specifically, as described above, the vehicle/implement 10/12 may include one or more load sensors 112, with each load sensor 112 configured to capture data indicative of the load being applied to the implement 12 be the soil. Such load may, in turn, be indicative of the subsurface soil layer characteristic(s). In this regard, as the vehicle/implement 10/12 travels across the field to perform the agricultural operation, the controller 114 may be configured to receive data from the load sensor(s) 112 (e.g., via the communicative link 120). As such, the controller 114 may be configured to process/analyze the received load data to determine or estimate the second value(s) of the subsurface soil layer characteristic(s) of the field at the current location of the vehicle/implement 10/12. For instance, the controller 114 may include a look-up table(s), suitable mathematical formula, and/or algorithms stored within its memory device(s) 110 that correlates the received load data to the subsurface soil layer characteristic(s) of the field.

It should be appreciated that the subsurface soil layer characteristic(s) may correspond to any suitable parameter(s) or value(s) associated with the subsurface soil conditions(s). For example, in several embodiments, the subsurface soil layer characteristic(s) may correspond to the presence and/or location/depth of a soil compaction layer within the field. However, in alternative embodiments, the subsurface soil layer characteristic(s) may correspond to any other suitable parameter(s)/value(s), such as the depth of the seedbed floor.

In accordance with aspects of the present disclosure, the controller 114 may be configured to truth and/or calibrate the first value(s) of the subsurface soil layer characteristic(s) based on the second value(s) of such characteristic(s). In general, the second value(s) of the subsurface soil layer characteristic(s) may be more accurate than the first value(s) determined based on the received RADAR data. More specifically, the load data may generally provide an accurate indication of the subsurface soil layer characteristic(s) of the field at the current penetration depth of the ground engaging tools of the implement 12. While the RADAR data provides an indication of the subsurface soil layer characteristic(s) at a range of depths, variations in the soil conditions across the field may impact the accuracy of such data. For example, moisture and salt may increase the amount that the soil absorbs or attenuates the output signal(s) emitted by the RADAR sensor(s) 104. However, oxygen content/porosity may decrease the amount that the soil absorbs or attenuates the output signal(s) emitted by the RADAR sensor(s) 104. As such, RADAR data captured in portion of the field having high soil moisture content, high soil salinity, and/or low soil oxygen content/porosity may indicate that the compaction layer is shallower than it really is. Furthermore, such RADAR data may result in a determination that the seedbed floor is shallower than it really is. Conversely, RADAR data captured in portion of the field having low soil moisture content, low soil salinity, and/or high soil oxygen content/porosity may result in a determination that the compaction layer is deeper than it really is. In this respect, the controller 114 may be configured to calculate or determine a differential(s) between the first and second values of the subsurface soil layer characteristic(s).

In several embodiments, the controller 114 may be configured to truth the first value(s) of the subsurface soil layer characteristic(s). As mentioned above, the load data may provide a more accurate indication of the subsurface soil layer characteristic(s) than the RADAR data. As such, the controller 114 may be configured to truth or otherwise determine the accuracy of the first and value(s) of the subsurface soil layer characteristic(s) based on the determined differential(s). For example, in one embodiment, the controller 114 may be configured to compare the determined differential(s) to an associated maximum differential value. Thereafter, when the determined differential(s) exceed the associated maximum differential value (thereby indicating that the first value(s) of the subsurface soil layer characteristic(s) is inaccurate), the controller 114 may be configured to notify the operator of vehicle/implement 10/12 that the first value(s) of the subsurface soil layer characteristic(s) is inaccurate. For instance, in one embodiment, the controller 114 may be configured to transmit instructions to the user interface 122 (e.g. via the communicative link 120) instructing the user interface 122 to provide a notification to the operator (e.g., by causing a visual or audible notification or indicator to be presented to the operator) that provides an indication that the first value(s) of the subsurface soil layer characteristic(s) is inaccurate. In such instances, the operator may then choose to initiate any suitable corrective action he/she believes is necessary, such as manually calibrating the RADAR data and/or first value(s) of the subsurface soil layer characteristic(s). Moreover, as will be described below, the controller 114 may be configured to automatically calibrate the first value(s) of the subsurface soil layer characteristic(s) when the determined differential(s) exceeds the associated maximum differential value.

In one embodiment, the controller 114 may be configured to truth the first value(s) of the subsurface soil layer characteristic(s) by adjusting one or more ground engaging tools of the implement 12. More specifically, as mentioned above, the subsurface soil layer characteristic(s) may correspond to the location/depth of the soil compaction layer within the field. In this respect, the controller 114 may be configured to determine the location/depth of the soil compaction layer based on the received RADAR data as described above. Based on this determination, the controller 114 may be configured to initiate adjustment of one or more ground engaging tools (e.g., a shank(s) 38) of the implement 12 such that the tool(s) penetrate the soil to the location/depth at which the RADAR data indicates the soil compaction layer is present. For example, the controller 114 may be configured to transmit instructions to the actuator(s) 106 (e.g., via the communicative link 120) instructing the actuator(s) 106 to adjust the penetration depth of the corresponding shank(s) 38 such that shank(s) 38 penetrate the soil to the location/depth at which the RADAR data indicates the soil compaction layer is present. Thereafter, the controller 114 may be configured to determine the load being applied to the implement 12 by the soil based on the data received from the load sensor(s) 112 as described above. When the compaction layer is present at the location/depth at which the RADAR data indicates, the load applied to the implement 12 by the soil may spike or otherwise exceed a predetermined threshold. When this occurs, the controller 114 may determine that the location/depth of the compaction as indicated by the RADAR data is accurate. Conversely, the controller 114 may determine that the location/depth of the compaction as indicated by the RADAR data is inaccurate (thereby indicating the RADAR data needs calibrated) when the load does not spike or otherwise exceed a predetermined threshold. As such, in such an embodiment, the controller 114 may be configured to determine the second value(s) of the subsurface soil layer characteristic(s) based on the determined first value(s) of such characteristic(s).

Additionally, the controller 114 may be configured to calibrate the determined first value(s) of the subsurface soil layer characteristic(s) based on the determined differential(s). In general, the controller 114 may be configured to adjust or otherwise modify the determined first value(s) based on the determined differential(s) such that the calibrated first value(s) provides an accurate indication of the subsurface soil layer characteristic(s) of the field. Specifically, in several embodiments, when it is determined that the differential(s) has exceeded the associated maximum differential value (thereby indicating the corresponding first value(s) of the subsurface soil layer characteristic(s) need calibrating), the controller 114 may be configured to determine one or more correction factors for the determined first value(s) based on the determined differential(s). Thereafter, the controller 114 may be configured to adjust the determined first value(s) based on the determined correction factor(s).

It should be appreciated that the controller 114 may be configured to calibrate the determined first value(s) ay any suitable time(s) during the performance of an agricultural operation, such as before beginning the performance of an agricultural operation and/or during the performance of such agricultural operation. Furthermore, it should be appreciated that the controller 114 may be configured to calibrate any suitable number of times during the performance of the agricultural operation, such once (e.g., before beginning the agricultural operation) or several (e.g., periodically during the agricultural operation).

The controller 114 may be configured to determine the correction factor(s) for the first value(s) of the subsurface soil layer characteristic(s) in any suitable manner. In one embodiment, the determined correction factor(s) may correspond to a single numerical value(s) that is mathematically combined with (e.g., multiplied by) the first value(s) of the subsurface soil layer characteristic(s). For example, in such an embodiment, the controller 114 may be configured to access one or more look-up tables stored within its memory device(s) 118. Each look-up table may, in turn, provide a correction factor value associated with a corresponding differential value. In another embodiment, the controller 114 may be configured to calculate the correction factor(s) from the determined differential value(s) using one or more mathematical formula stored within its memory device(s) 118. However, in alternative embodiments, the controller 114 may be configured to calibrate the first value(s) of the subsurface soil layer characteristic(s) in a more complex manner. For instance, the controller 114 may calibrate the determined first value(s) using one or more suitable algorithms that modify the such value(s) in a more complex manner, such as by modifying the shape(s) of the echo signal(s) associated with the RADAR data, based on the determined differential values. Additionally, in one embodiment, the controller 114 may be configured to generate a field map based on the calibrated first value(s) of the subsurface soil layer characteristic(s).

Figure 4:
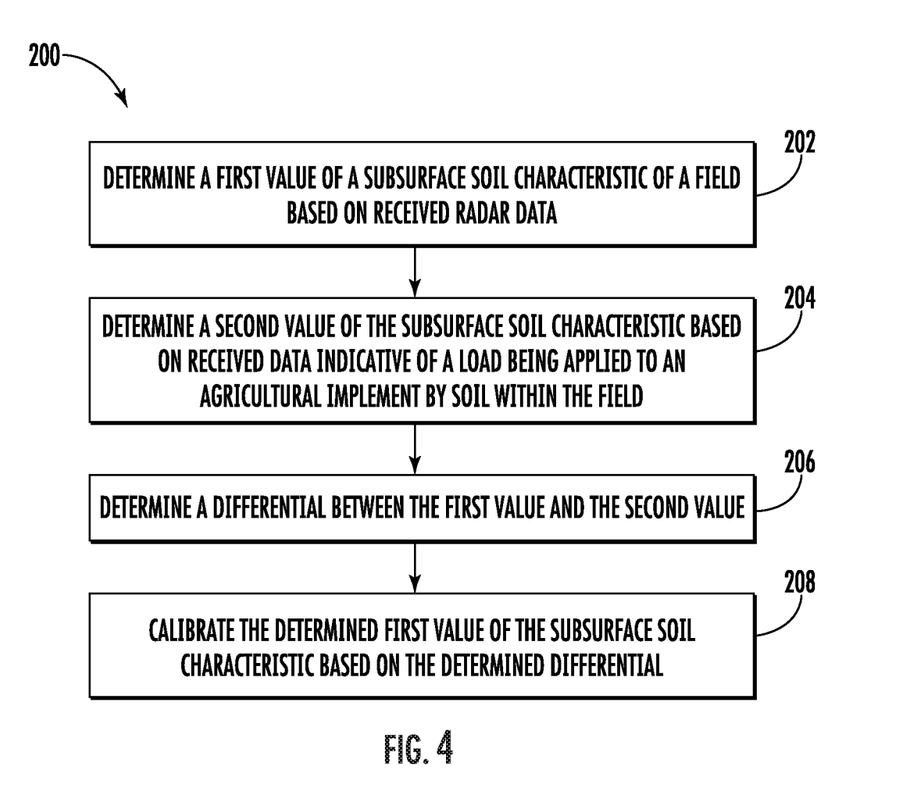
FIG. 4 illustrates a flow diagram of one embodiment of a method for determining subsurface soil layer characteristics in accordance with aspects of the present subject matter.

Referring now to FIG. 4, a flow diagram of one embodiment of a method 200 for determining subsurface soil layer characteristics is illustrated in accordance with aspects of the present subject matter. In general, the method 200 will be described herein with reference to the agricultural work vehicle 10 and implement 12 shown in FIGS. 1 and 2, as well as the various system components shown in FIG. 3. However, it should be appreciated that the disclosed method 200 may be implemented with work vehicles having any other suitable vehicle configuration, implements having any other suitable implement configuration, and/or within systems having any other suitable system configuration. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 4, at (202), the method 200 may include determining, with one or more computing devices, a first value of a subsurface soil layer characteristic of a field based on received RADAR data. For instance, as described above, the controller 114 may be configured to determine a first value(s) of one or more subsurface soil layer characteristics (e.g., the presence and/or location of a compaction layer) based on data received from one or more RADAR sensor(s) 104 mounted on the vehicle and/or the implement 12.

Additionally, at (204), the method 200 may include determining, with the one or more computing devices, a second value of the subsurface soil layer characteristic based on received data indicative of a load being applied to an agricultural implement by soil within the field. For instance, as described above, the controller 114 may be configured to determine a second value(s) of the subsurface soil layer characteristic(s) based on data received from one or more load sensor(s) 112 mounted on the vehicle and/or the implement 12.

Moreover, as shown in FIG. 4, at (206), the method 200 may include determining, with the one or more computing devices, a differential between the first value and the second value. For instance, as described above, the controller 114 may be configured to determine the differential(s) between the corresponding first and second values of the subsurface soil layer characteristic(s).

Furthermore, at (208), the method 200 may include calibrating, with the one or more computing devices, the determined first value of the subsurface soil layer characteristic based on the determined differential. For instance, as described above, the controller 114 may be configured to calibrate the determined first value(s) of the subsurface soil layer characteristic(s) based on the determined differential(s).

It is to be understood that the steps of the method 200 are performed by the controller 114 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 114 described herein, such as the method 200, is implemented in software code or instructions which are tangibly stored on a tangible computer readable medium. The controller 114 loads the software code or instructions via a direct interface with the computer readable medium or via a wired and/or wireless network. Upon loading and executing such software code or instructions by the controller 114, the controller 114 may perform any of the functionality of the controller 114 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for determining subsurface soil layer characteristics as an agricultural implement is towed across a field by a work vehicle, the system comprising:
    a RADAR sensor provided in operative association with one of the work vehicle or the agricultural implement, the RADAR sensor configured to capture data indicative of a subsurface soil layer characteristic of the field;
    a load sensor provided in operative association with one of the work vehicle or the agricultural implement, the load sensor configured to capture data indicative of a load applied to the agricultural implement by soil within the field, the load being indicative of the subsurface soil layer characteristic;
    a controller communicatively coupled to the load sensor and the RADAR sensor, the controller configured to:
        determine a first value of the subsurface soil layer characteristic based on the data received from the RADAR sensor;
        determine a second value of the subsurface soil layer characteristic based on the data received from the load sensor; and
        determine a differential between the first value and the second value.

2. The system of claim 1, wherein the controller is further configured to calibrate the determined first value of the subsurface soil layer characteristic based on the determined differential.

3. The system of claim 2, wherein the controller is further configured to:
    determine a correction factor based on the determined differential; and
    adjust the determined first value of the subsurface soil layer characteristic based on the determined correction factor to calibrate the determined first value.

4. The system of claim 1, wherein the controller is further configured to:
    compare the determined differential to a maximum differential value; and
    calibrate the determined first value of the subsurface soil layer characteristic when it is determined that the differential exceeds the maximum differential value.

5. The system of claim 4, wherein the controller is further configured to provide a notification to an operator of the work vehicle when it is determined that the differential exceeds the maximum differential value.

6. The system of claim 1, further comprising:
    a tool configured to penetrate a soil surface of the field as the agricultural implement is moved across the field, wherein the controller is further configured to:
        initiate an adjustment of a penetration depth of the tool as the agricultural implement is being moved across the field; and
        determine the load applied to the agricultural implement by the soil relative to a predetermined load value based on the data received from the load sensor.

7. The system of claim 6, wherein the controller is further configured to initiate an adjustment of the tool based on the determined first value of the subsurface soil layer characteristic.

8. The system of claim 1, further comprising:
    a tool configured to penetrate a soil surface of the field as the agricultural implement is moved across the field, the load sensor provided in operative association with the tool such that the load sensor is configured to capture data indicative of a load applied to the tool by the soil, the load applied to the tool being indicative of the subsurface soil layer characteristic.

9. The system of claim 8, further comprising:
    an implement frame; and
    a fluid-driven actuator coupled between the implement frame and the tool, the fluid-driven actuator configured to bias the tool towards a predetermined tool position,
    wherein the load sensor comprises a pressure sensor provided in operative association with the fluid-driven actuator, the pressure sensor configured to detect a fluid pressure associated with the fluid-driven actuator, the fluid pressure being indicative of the load applied to the tool by the soil.

10. The system of claim 1, wherein the load sensor is configured to capture data indicative of a draft load applied to the work vehicle by the agricultural implement, the draft load being indicative of the subsurface soil layer characteristic.

11. The system of claim 1, wherein the tool comprises a shank.

12. The system of claim 1, wherein the subsurface soil layer characteristic comprises a location of a compaction layer.

13. A method for determining subsurface soil layer characteristics as an agricultural implement is towed across a field by a work vehicle, the method comprising:
    determining, with one or more computing devices, a first value of a subsurface soil layer characteristic based on received RADAR data;
    determining, with the one or more computing devices, a second value of the subsurface soil layer characteristic based on received data indicative of a load being applied to the agricultural implement by soil within the field;
    determining, with the one or more computing devices, a differential between the first value and the second value; and
    calibrating, with the one or more computing devices, the determined first value of the subsurface soil layer characteristic based on the determined differential.

14. The method of claim 13, wherein calibrating the determined first value comprises:
    determining, with the one or more computing devices, a correction factor based on the determined differential; and
    adjusting, with the one or more computing devices, the determined first value of the subsurface soil layer characteristic based on the determined correction factor.

15. The method of claim 13, further comprising:
    comparing, with the one or more computing devices, the determined differential to a maximum differential value; and
    calibrating, with the one or more computing devices, the determined first value of the subsurface soil layer characteristic when it is determined that the differential exceeds the maximum differential value.

16. The method of claim 15, further comprising:
    providing, with the one or more computing devices, a notification to an operator of the work vehicle when it is determined that the differential exceeds the maximum differential value.

17. The method of claim 13, wherein:
the agricultural implement includes a tool configured to penetrate a soil surface of the field as the agricultural implement is moved across the field; and
determining the second value of the subsurface soil layer characteristic comprises:
  initiating, with the one or more computing devices, adjustment of a penetration depth of the tool as the agricultural implement is being moved across the field; and
  determining, with the one or more computing devices, the load applied to the agricultural implement by the soil relative to a predetermined load value based on the data received from the load sensor.

18. The method of claim 17, wherein initiating adjustment of the penetration depth of the tool comprises initiating, with the one or more computing devices, adjustment of the tool based on the determined first value of the subsurface soil layer characteristic.

19. The method of claim 13, wherein the subsurface soil layer characteristic comprises a location of a compaction layer.

\* \* \* \* \*